(12) United States Patent
Montojo et al.

(10) Patent No.: US 7,657,277 B2
(45) Date of Patent: Feb. 2, 2010

(54) METHOD AND SYSTEM FOR POWER CONTROL IN A COMMUNICATION SYSTEM

(75) Inventors: Juan Montojo, San Diego, CA (US); Hari Sankar, College Station, TX (US); Gang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 841 days.

(21) Appl. No.: 11/233,631

(22) Filed: Sep. 22, 2005

(65) Prior Publication Data

US 2006/0093026 A1    May 4, 2006

Related U.S. Application Data

(60) Provisional application No. 60/612,834, filed on Sep. 24, 2004.

(51) Int. Cl.
    *H04W 52/18* (2009.01)
(52) U.S. Cl. .......................... 455/522; 455/69
(58) Field of Classification Search ............... None
    See application file for complete search history.

(56) References Cited

U.S. PATENT DOCUMENTS 6,535,723 B1 * 3/2003 Jiang et al. .............. 455/522 X

FOREIGN PATENT DOCUMENTS

| EP | 1039656 | 9/2000 |
|----|---------|--------|
| EP | 1339175 | 8/2003 |
| EP | 1349295 | 10/2003 |
| EP | 1517457 | 3/2005 |
| WO | 9718643 | 5/1997 |
| WO | 0124402 | 4/2001 |
| WO | 2004034609 | 4/2004 |

OTHER PUBLICATIONS

International Search Report—PCT/US2005/034049, International Search Authority—European Patent Office—Aug. 21, 2007.
International Preliminary Report Patentability—PCT/US2005/034049, International Search Authority—The International Bureau of WIPO—Sep. 12, 2007.
Written Opinion- PCT/US2005/034049, International Search Authority- European Patent Office—Sep. 7, 2007.

(Continued)

*Primary Examiner*—Philip J Sobutka
(74) *Attorney, Agent, or Firm*—Rupit M. Patel

(57) ABSTRACT

Apparatus and methods efficiently estimate signal-to-noise ratios of a received signal irrespective of intentional adjustments to transmitting power due to fluctuating data rates. For example, in one embodiment, the variation in power due to the change in data rate is decoupled from environmental sources for variations in power. In one embodiment, the signal to noise ratio is adjusted for the data rate. In another embodiment, another signal is used as a reference for the signal to noise computation. This advantageously permits a system to efficiently and accurately control power in a power control loop for efficient use of spectral bandwidth and for relatively good grade of service (GoS).

37 Claims, 8 Drawing Sheets

OTHER PUBLICATIONS

3GPP TS 25.221 V6.4.1: "3rd Generation Partnership Project; Technical Specification Group Radio Access Network; Physical Channels and mapping of transport channels onto physical channels (TDD)(Release 6)", pp. 1-100 (Jun. 2005).

3GPP TS 25.222 V6.2.0: "3rd Generation Partnership Project; Technical Specification Group Radio Access Network; Multiplexing and channel coding (TDD)(Release 6), (Release 6)", pp. 1-67 (Dec. 2004).

* cited by examiner

METHOD AND SYSTEM FOR POWER CONTROL IN A COMMUNICATION SYSTEM

CLAIM OF PRIORITY UNDER 35 U.S.C. §119

This present application for patent claims priority to Provisional Application No. 60/612,834, entitled "METHOD APPARATUS FOR POWER CONTROL IN TIME DIVISION DUPLEX COMMUNICATIONS SYSTEMS," filed Sep. 24, 2004, and assigned to the assignee hereof and hereby incorporated by reference herein.

BACKGROUND

1. Field

The invention generally relates to wireless communications, and in particular, to power control in a cellular communication system, such as a code division multiple access (CDMA) system.

2. Background

Code Division Multiple Access (CDMA) techniques provide spectrally-efficient solutions to multiplexing data over wireless systems. These systems can include cellular phone networks, wireless telephony systems, personal communications systems (PCS) and the like.

Relatively fast power control loops are typically employed by CDMA systems. Power control is used to prevent disparate signals from interfering with each other and to maintain signal-to-interference plus noise ratios, hereinafter, signal-to-noise ratios (SNR) within desired ranges.

To use spectral bandwidth in an efficient manner, it is desirable to be able to communicate with variable data rates and to adjust a transmitting power with adjustments in the data rate. This uses spectral bandwidth more efficiently and also enhances the battery life of battery-powered stations. However, conventional receivers are not able to distinguish between intentional adjustments to transmitting power due to changes in data rate and changes in received power due to path losses or environmental conditions such as the effects of constructive and destructive multipath interference, also known as Rayleigh fading.

SUMMARY

One aspect is an apparatus for a wireless communication system, where the apparatus includes: a receiver configured to receive a transmitted signal from a transmitter having at least a first data rate and a second data rate that is other than the first data rate, wherein a transmitted power of the transmitted signal for the second data rate is adjustable by an offset amount relative to a transmitted power for the first data rate; a receiver circuit configured to determine a reference signal characteristic associated with the transmitted signal; and a processing circuit configured to compare the reference signal characteristic to a target and to generate a power control command based at least in part on the comparison and on information provided by the transmitted signal.

One aspect is a method of controlling power in a wireless communication system, where the method includes: receiving from a transmitter a transmitted signal having at least a first data rate and a second data rate that is other than the first data rate, wherein a transmitted power of the transmitted signal for the second data rate is adjustable by an offset value relative to a transmitted power for the first data rate; determining a reference signal characteristic associated with the transmitted signal; comparing the reference signal characteristic to a target; and generating a power control command based at least in part on the comparison and on information provided by the transmitted signal.

One aspect is a method of determining a reference signal characteristic, where the method includes: determining a signal characteristic of a received signal; adjusting the signal characteristic with an offset value to account for an adjustment in power due to an adjustment in code rate; and using the adjusted signal characteristic for power control.

One aspect is a method of determining a signal characteristic, where the method includes: determining a signal characteristic of a received signal; separating a first component of the signal characteristic due to channel conditions and a second component due to a power adjustment from a change in data rate; and using the first component of the signal characteristic for power control.

One aspect is a computer-readable medium having computer-executable instructions for performing a method of controlling power in a wireless communication system, where the method includes: receiving from a transmitter a transmitted signal having at least a first data rate and a second data rate that is other than the first data rate, wherein a transmitted power of the transmitted signal for the second data rate is adjustable by an offset value relative to a transmitted power for the first data rate; determining a reference signal characteristic associated with the transmitted signal; comparing the reference signal characteristic to a target; and generating a power control command based at least in part on the comparison and on information provided by the transmitted signal.

One aspect is a computer-readable medium having computer-executable instructions for performing a method of determining a reference signal characteristic, where the method includes: determining a signal characteristic of a received signal; adjusting the signal characteristic with an offset value to account for an adjustment in power due to an adjustment in code rate; and using the adjusted signal characteristic for power control.

One aspect is a computer-readable medium having computer-executable instructions for performing a method of determining a signal characteristic, where the method includes: determining a signal characteristic of a received signal; separating a first component of the signal characteristic due to channel conditions and a second component due to a power adjustment from a change in data rate; and further comprising using the first component of the signal characteristic for power control.

One aspect is an apparatus for controlling power of a wireless communication system, where the apparatus includes: means for receiving from a transmitter a transmitted signal having at least a first data rate and a second data rate that is other than the first data rate, wherein a transmitted power of the transmitted signal for the second data rate is adjustable by an offset value relative to a transmitted power for the first data rate; means for determining a reference signal characteristic associated with the transmitted signal; means for comparing the reference signal characteristic to a target; and means for generating a power control command based at least in part on the comparison and on information provided by the transmitted signal.

One aspect is an apparatus for determining a reference signal characteristic, where the apparatus includes: means for determining a signal characteristic of a received signal; means for adjusting the signal characteristic with an offset value to account for an adjustment in power due to an adjustment in code rate; and means for using the adjusted signal characteristic in a power control loop.

One aspect is an apparatus for determining a signal characteristic, where the apparatus includes: means for determining a signal characteristic of a received signal; means for separating a first component of the signal characteristic due to channel conditions and a second component due to a power adjustment from a change in data rate; and means for using the first component of the signal characteristic for power control.

BRIEF DESCRIPTION OF THE DRAWINGS

These drawings and the associated description herein are provided to illustrate specific embodiments of the invention and are not intended to be limiting.

DETAILED DESCRIPTION

Figure 1:
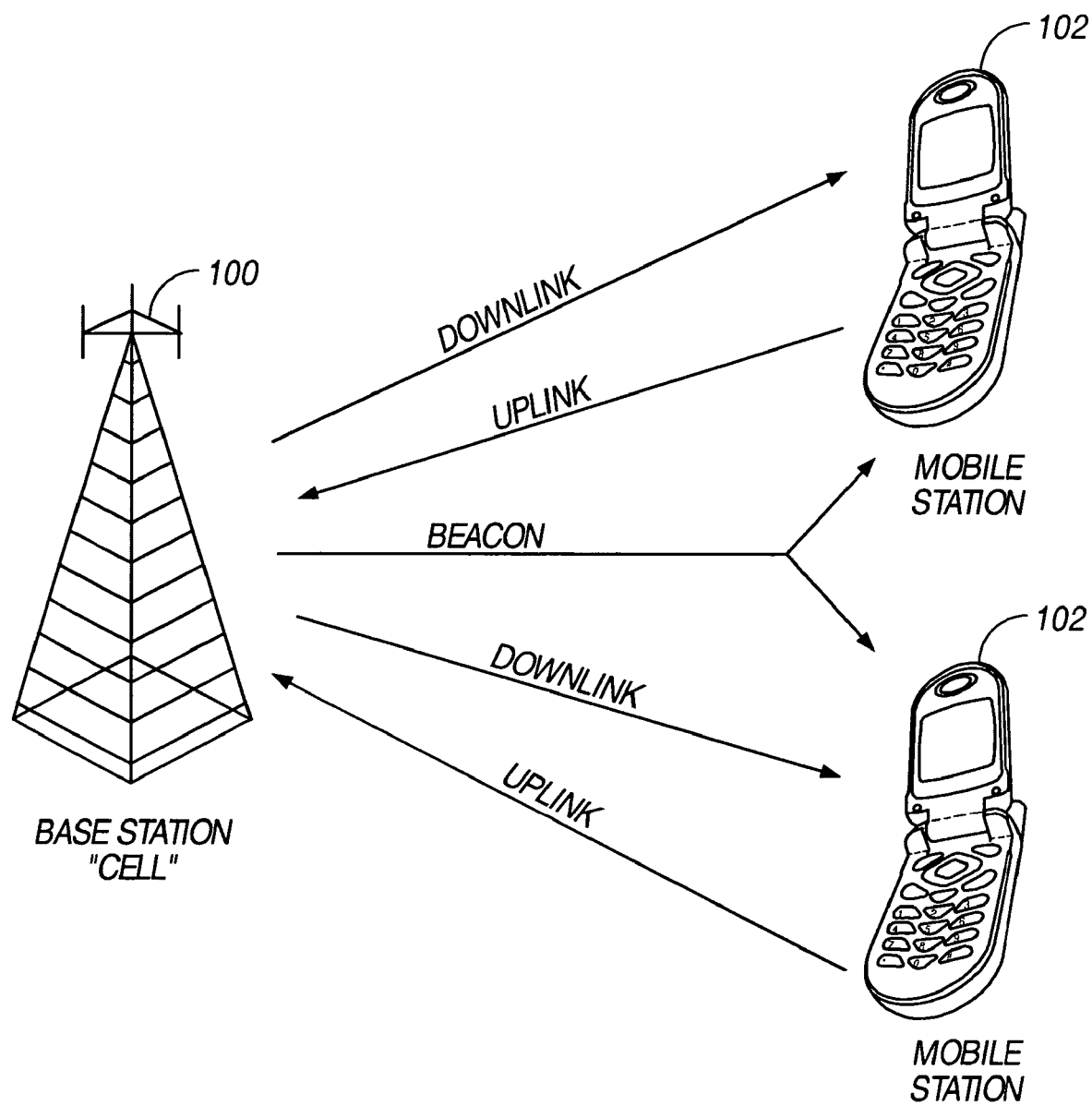
FIG. 1 illustrates an example of a system in which an embodiment of the invention can be practiced.

As noted above, this invention applies to wireless communication systems, such as those using CDMA technology.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

One advantage of CDMA multiplexing is the spreading gain from the spreading and subsequent despreading of data. This increases the SNR of a received CDMA signal (after despreading). In addition, before a signal is spread, other processes are typically applied to be able to correct errors that occur in the transmission of symbols. These processes include, for example, bit interleaving techniques and forward error correction (FEC) techniques. Examples of forward error correction techniques include convolution coding, turbo coding, block coding, and the like. These techniques can be used separately or in combination. In a convolutional code, m source bits are coded into n coded bits. The fraction m/n is referred to as the code rate. The improvement in signal-to-noise ratio (SNR) of a coded signal versus an uncoded signal is referred to as a coding gain. In this context, uncoded signal refers to a source that has not been processed by a forward error correction scheme. The uncoded signal can itself correspond to a form of coded data, such as compressed audio, video, or graphical data.

The coding gain varies with the code rate. When code rates m/n are relatively high, the coding gain is relatively small. When code rates mm are relatively low, the coding gain is relatively high. However, with relatively low code rates, relatively more coded data exists for a given amount of uncoded data. In one embodiment, when the uncoded signal can vary in data rate, the code rate used by the coding scheme is varied such that low code rates are used with low data rates, and high code rates are used with high data rates. This improves the SNR of the data sent at the low data rate relative to the data sent at the high data rate by the relative difference in coding gain used. For the same overall SNR, signals with lower data rates can be transmitted with less power than signals with higher data rates.

It is desirable to use allocated spectral bandwidth efficiently. This permits more data, such as more telephone calls, to be communicated over a limited bandwidth. In many forms of communication, the data can vary in rate over time. For example, a user browsing the Web may request a relatively large amount of data to download a Web Page, but then may not request another Web page for a relatively long period of time. Another example is voice communications. When a caller is speaking, the amount of data that is transferred over the telephone network can be relatively high. However, when the caller is silent, the amount of data transferred can be relatively low and can even approach zero.

To use spectral bandwidth efficiently, it is desirable to communicate with variable data rates and to correspondingly adjust a transmitting power used to send the data. In addition to the efficient use of spectral bandwidth, reducing transmitting power can enhance the battery life of battery-powered stations, such as portable cell phones. However, it can be relatively difficult for a receiver to distinguish between intentional adjustments to transmitting power due to changes in data rate and variations in power due to environmental conditions such as the effects of constructive and destructive multipath interference, also known as Rayleigh fading. Embodiments of the invention advantageously and efficiently estimate signal-to-noise ratios of a received signal irrespective of intentional adjustments to transmitting power due to fluctuating data rates. This advantageously permits communication systems to decrease the power used to transmit relatively low data rate signals, thereby preserving power for the rest of the signals. This advantageously increases the capacity and/or improves the quality of the signals transmitted.

Although particular embodiments are described herein, other embodiments of the invention, including embodiments that do not provide all of the benefits and features set forth herein, will be apparent to those of ordinary skill in the art. In addition, while generally described in the context of Universal Mobile Telecommunications System-Time Division Duplex (UMTS-TDD), the principles and advantages described herein will be applicable to other data communication systems permitting variations in data rates. There are two UMTS-TDD systems: High Chip Rate (HCR), which is also known as TD-CDMA, uses the same chip rate as WCDMA, i.e., about 3.84 Mcps, and Low Chip Rate (LCR), which is also known as TD-SCDMA, which is at a chip rate of about one third of that of WCDMA, i.e., about 1.28 Mcps. In one embodiment of a UMTS-TDD system, CDMA and TDMA techniques are combined.

FIG. 1 illustrates an example of a system in which the power control techniques described herein can be practiced. A base station 100 or "cell" transmits data intended for a plurality of mobile stations 102, such as cell phones, notebook computers, personal digital assistants (PDAs), wireless email devices, or other wireless voice and/or data devices. Other terms used to describe a mobile station 102 include "remote station," "subscriber station" and "user equipment (UE)." A wide variety of types of data can be communicated, including, but not limited to, system information, voice data, graphics, email, multi-media, and the like.

A beacon signal or a pilot signal is provided by the base station 100 for all of the mobile stations 102 in the base station's area. The beacon signal is typically used to provide system information to the mobile stations 102 and to assist in the handoff from one base station to another, such as, for example, when a mobile station 102 moves from one base station's area to another base station's area.

Traffic channels carry information specific to a mobile station 102. Generally, "downlink" refers to the forward traffic channel from the base station 100 to the mobile station 102. "Uplink" refers to the reverse traffic channel from the mobile station 102 to the base station 100.

Figure 2:
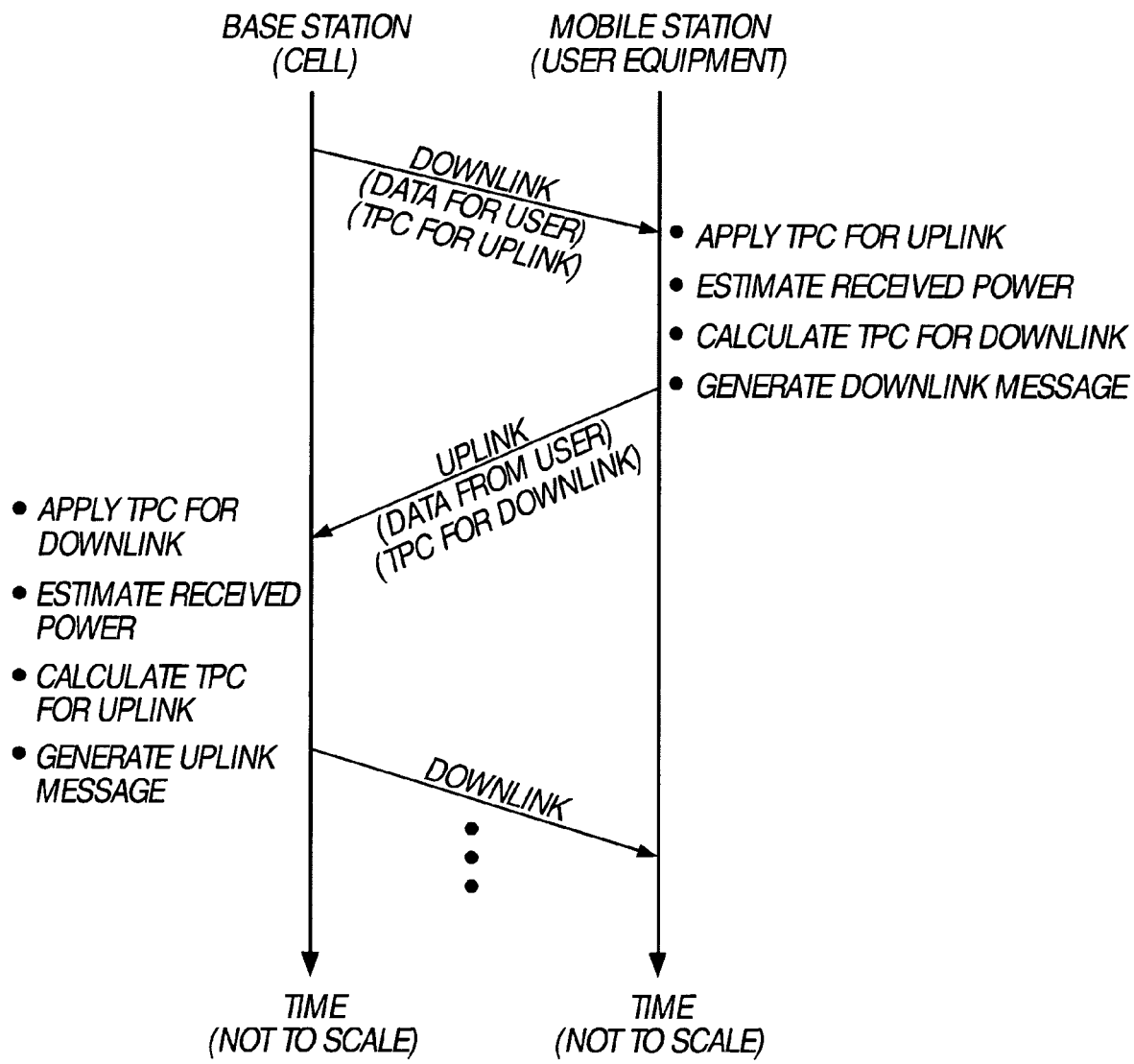
FIG. 2 shows a signal communication diagram between a base station and a mobile station (remote station).

FIG. 2 shows a signal communication diagram between a base station, e.g., the base station 100 of FIG. 1 and a mobile station, e.g., the mobile station 102 of FIG. 1. Typically, a base station 100 and a mobile station 102 send data back and forth to each other. This data is typically encapsulated in packets of data, which can be organized as slots, frames, and the like. The data can correspond to any kind of data, including, but not limited to: voice data, Web data, graphics, email, electronic documents, multi-media, and the like. In one embodiment, data included in the downlink includes data for the user of the mobile station 102 as well as a transmit power control (TPC) command for the uplink communication from the mobile station 102 back to the base station 100.

The TPC is typically one bit of data indicating an up or down instruction to the receiver, e.g., the base station 100 or the mobile station 102, that is, to increase or decrease transmit power. Typically, the TPC bit is standardized to control output power in increments of one decibel (dB) or by absolute power, but other step sizes could be used. For example, in one embodiment, if five consecutive TPC commands of the same direction (up/down) are indicated, the controlled transmitter changes power by 1 dB. The mobile station 102 reads the TPC, and increases or decreases the output power when transmitting the uplink for the communication back to the base station 100. Consequently, the mobile station 102 determines the received power of the downlink by evaluating the SNR of the downlink, and the mobile station 102 sends its own TPC command to the base station 100 for feedback control of the power of the downlink. This keeps the SNR received by the mobile station 102 relatively consistent for a relatively consistent Grade of Service (GoS), e.g., quality expected by a customer, which can be specified by a frame error rate (FER). Similarly, the base station 100 also determines the received power of the uplink by evaluating the SNR of the uplink, and the base station 100 accordingly adjusts the TPC provided to the mobile station 102 for control of the power of the uplink for a desired SNR at the base station 100. This back and forth exchange of TPC commands over the uplink and the downlink may be repeated for a finite duration or indefinitely.

Figure 3:
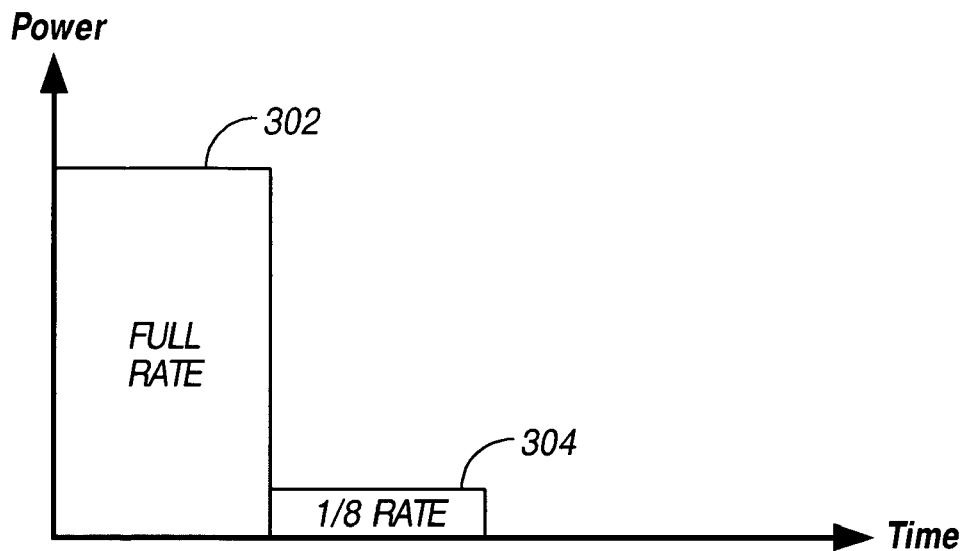
FIG. 3 is a graphical illustration of adjusting power level as a function of data rate.

FIG. 3 illustrates adjusting transmitted power as a function of data rate. The device sending the data selects the data rate for use. For example, when a caller of a cell phone is speaking, the data rate used by the cell phone can be relatively high. Conversely, when the caller is silent, the data rate used by the cell phone can be relatively low. In FIG. 3, time is indicated along a horizontal axis. Transmitted power is indicated along a vertical axis.

As illustrated in FIG. 3, in a first time period 302, data is transmitted at a full rate and at a relatively high power level. In a second time period 304, data is transmitted at a one-eighth rate and at a relatively low power level. For a given code rate m/n and a given SNR, the power used to transmit lower rate data, such as one-eighth rate data, can be lower than for higher rate data, such as full-rate data. The code rate mm corresponds to the number of unencoded source symbols m divided by the number of coded symbols n used in connection with a forward error correction process, such as convolutional codes. The power used to transmit lower rate data can be reduced because the additional encoded symbols from the use of a lower code rate (lower mm) provides more coding gain. Table I illustrates examples of data rates, code rates (for convolutional codes), and power offsets, i.e., a reduction in power from a baseline level of power. These power offsets are also known as "β." In one embodiment, the power offsets used correspond to the relative differences in coding gain with the varying code rates.

TABLE I

| Data Rate | Code Rate | Power Offset |
|---|---|---|
| Full Rate | 0.75 | 0 |
| ½ Rate | 0.5 | 3 dB |

TABLE I-continued

| Data Rate | Code Rate | Power Offset |
|---|---|---|
| ¼ Rate | 0.25 | 6 dB |
| ⅛ Rate | 0.10 | 9 dB |

A transmitter can change the data rate in response to the type of data being transmitted. For example, when digital video is being transmitted, relatively static frames can be sent at relatively low data rates, but a relatively higher data rate may be needed to send relatively dynamic frames with more data. In another example, a relatively high data rate may be needed to carry the speech of a caller in a cell phone call. However, when the caller is silent, a relatively low data rate can be used. These data rates can fluctuate depending on the data to be transmitted. However, when the transmitted power is adjusted with changes in the data rate, existing receivers are incapable of distinguishing between these intentional power variations and power variations due to Rayleigh fading and other environmental factors. Adjusting transmitted power with adjustments in data rate is desirable and can increase the number of users of the cellular communication system and can also increase battery life of battery-powered devices.

Figure 4:
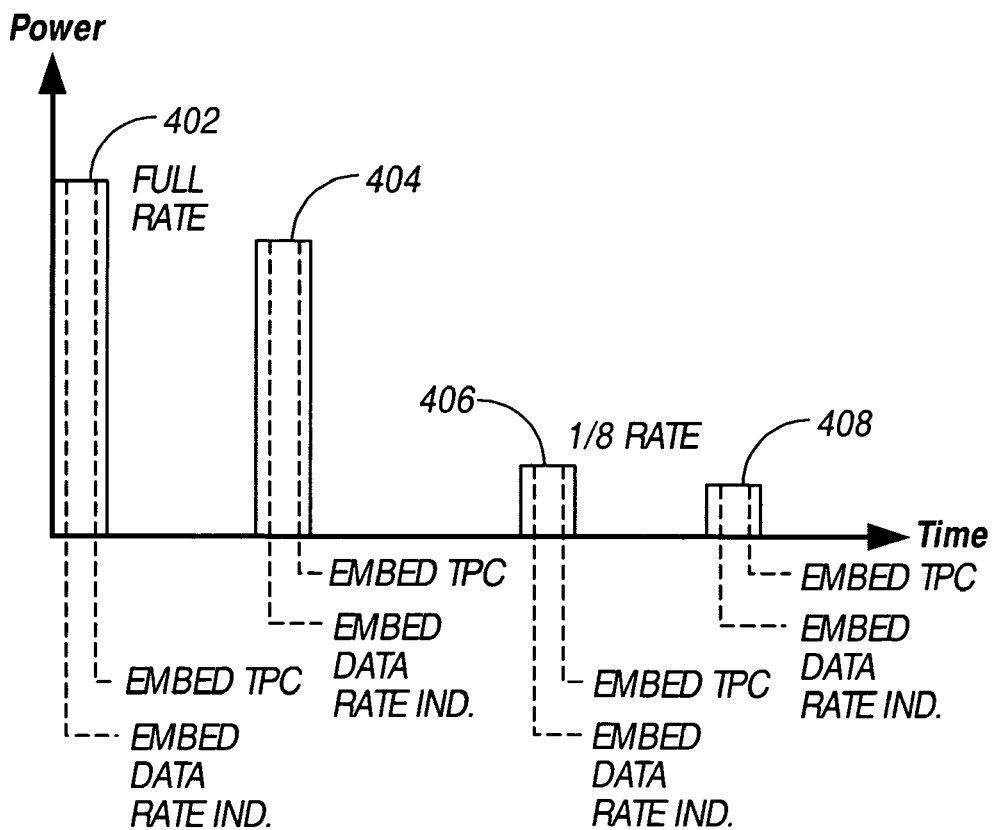
FIG. 4 is a graphical illustration of data communicated in bursts.

FIG. 4 is a graphical illustration of data communicated in bursts. Time is indicated along a horizontal axis. Transmitted power is indicated along a vertical axis. From left to right, data for a full rate portion of a transmission is represented by a first burst of data 402 and a second burst of data 404. Data for a one-eighth rate portion of a transmission is represented by a third burst of data 406 and a fourth burst of data 408. For example, a relatively short burst of data 402 can include an embedded data rate indication 410 and an embedded TPC bit 412 in addition to the data for the traffic channel. In this example, i.e., with UMTS-TDD, the data rate indication 410 is embedded in a data rate control word denoted TFCI (Transport Format Combination Indicator). A communication link has a limited set of TFCI values allowed. These values map to particular types of encoding used for the transmitted data. The encoding process may involve several steps, for example, i.e., with UMTS-TDD, there is channel encoding via a convolutional or turbo encoder with a particular, fixed code rate, which is followed by a "Rate Matching" step that performs puncturing or repetition of encoded symbols to match the number of symbols available for a given transmission. Therefore, the TFCI information identifies a particular combination of channel encoding and "Rate Matching" parameters used in the decoding process at the receiver.

Figure 5:
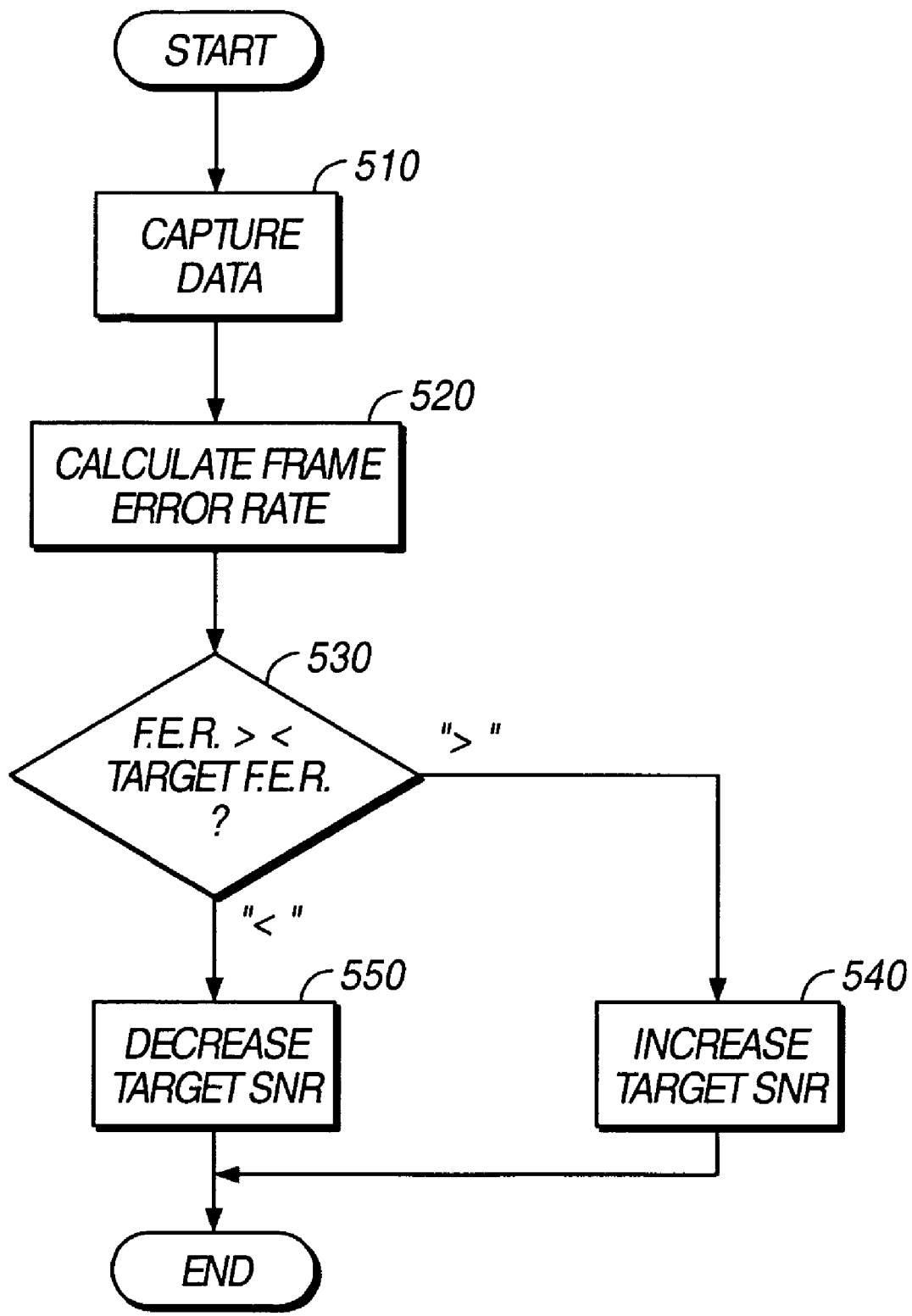
FIG. 5 illustrates a process of an adaptive adjustment of a target signal-to-noise ratio (SNR).

FIG. 5 illustrates a process of an adaptive adjustment of a target signal-to-noise ratio (SNR). In one embodiment, at least two control loops cooperate for power control. An outer loop is illustrated in FIG. 5. The outer loop adaptively adjusts a target SNR for a particular grade of service (GoS). A frame data or bit data error rate can be used as an indication of a GoS. The frame data error rate can be estimated at the receiver using the forward error control decoding mechanisms such as using Cyclic Redundancy Check (CRC) information covering the transmitted symbols. The target SNR for a particular GoS can vary with environmental conditions. For example, users who are moving typically require better (higher) SNR performance than users who are stationary for the same GoS.

An inner loop, which will be described later in connection with FIGS. 6-9, uses the target SNR to generate transmit power control (TPC) commands to maintain the received SNR at approximately the target SNR. The inner loop is executed relatively quickly so that the TPC commands can compensate for relatively rapidly changing received signal strength, such as Rayleigh fading encountered by a moving mobile station 102. In one embodiment, the inner loop is executed more frequently than the outer loop. The illustrated process can be modified in a variety of ways. For example, in another embodiment, various portions of the illustrated process can be combined, can be rearranged in an alternate sequence, can be removed or substituted, and the like. In one embodiment, the outer control loop of FIG. 5 is implemented by firmware programmed as instructions for a general-purpose processor or dedicated, such as in an application specific integrated circuit (ASIC). However, the outer control loop can also be implemented using dedicated hardware or by a combination of hardware and firmware. Initially, the process can begin with a predetermined value for the target SNR.

In this illustrated embodiment, the process begins in a state 510 and captures data received from the transmitter. The data may be captured over a selected interval of time for which a frame error rate is computed. After capturing a selected amount of data, the data is inspected for errors and corrected. For example, in the transmission of digital data over wireless networks, the data is typically encoded using forward error correction codes, such as convolutional codes.

The process advances to a state 520, where a frame error rate is calculated by monitoring the residual errors after decoding of the forward error correction CRC. In one embodiment, the frame error rate may be determined by identifying the number of frames found in error over the total number of frames captured in the interval of time.

The process advances to a decision block 530, where the process proceeds to compare the observed frame error rate to a target value for the frame error rate. In one embodiment, a target value of 1% is used as the target value for the frame error rate. Other appropriate values for a desired GoS will be readily determined by one of ordinary skill in the art.

When the observed frame error rate is larger than the target value for the frame error rate, the process proceeds from the decision block 530 to a state 540 and increases the target SNR. This is used by the inner control loop to increase the received SNR, which typically reduces the observed frame error rate when an increase in output power is available from the transmitting device, e.g., base station 100 or mobile station 102, sending the data for which the frame error rate is observed.

When the observed frame error rate is smaller than the target value for the frame error rate, the process proceeds from the decision block 530 to a state 550 and decreases the target SNR. The process can also be modified to provide an intermediate range for which no adjustment to target SNR is made. The process repeats in an ongoing process to adjust the target SNR to provide the selected frame error rate.

Figure 6:
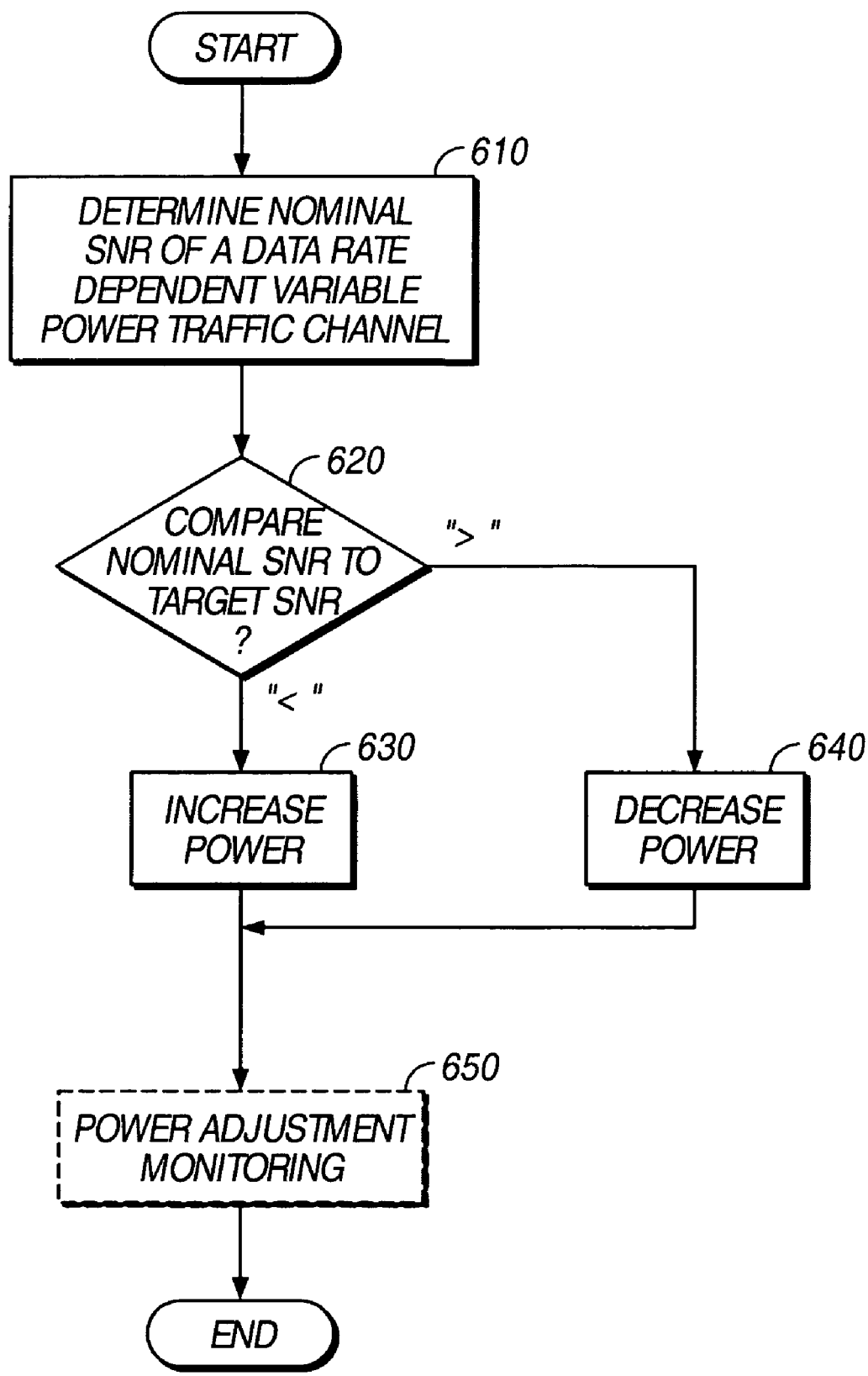
FIG. 6 illustrates a process of determining power control commands.

FIG. 6 illustrates a process of determining power control commands. The process illustrated in FIG. 6 is generally applicable to the power control of base stations 100 or mobile stations 102. The illustrated process can be modified in a variety of ways. For example, in another embodiment, various portions of the illustrated process can be combined, can be rearranged in an alternate sequence, can be removed or substituted, and the like.

The process corresponds to an "inner" loop, in which a receiver communicates with a transmitter to adjust the output power of the transmitter so that the receiver receives the transmitted signal with a selected SNR. For example, this relatively fast inner loop can adjust the output power from a base station 100 or from a mobile station 102 so that path losses due to Rayleigh fading or due to distance can be accommodated via adjustments in transmitter output power for the particular traffic channel. The output power of a transmitter will have practical limits. For example, the output power can be limited by an amplifier's output limits, by the number of users among which a portion of a frequency spectrum is shared, by FCC limits, by a base station coverage area, and the like.

The illustrated process starts in a state 610, where the process determines a nominal SNR of a traffic channel with an output power varying with a varying data rate. Traffic channel can vary in data rate according to a variety of factors. For example, when a caller is not talking, little or no data is transferred. However, when a caller is talking, relatively more data is transferred, and the data rate can increase. As described earlier, when a signal carrying data at a low data rate is transmitted, the code rate mm for the low data rate also decreases over that of a high data rate signal. Lower code rates, which increase the SNR of the signal (after decoding), can be used to lower the output power of the signal transmitted for a given SNR (after decoding) at the receiver. The Viterbi algorithm is an example of a technique that can be used to decode a convolutional code.

A decrease in the transmitted output power is perceived by the receiver as a decrease in SNR (prior to decoding of forward error correction codes). For example, the SNR of the received signal decreases with a decrease in the output power in the transmitter. For a conventional receiver executing transmit power control using the SNR of the received signal code chips or signal-coded symbols (without taking into consideration the coding gain of the associated transmission), this decrease in SNR due to an intentional decrease in output power would be indistinguishable from a fluctuation in output power due to an environmental condition such as Rayleigh fading. Accordingly, conventional UMTS TDD systems typically do not adjust output power when adjusting the data rate of a transmitted signal. This disadvantageously under-utilizes the capacity of the system and provides users receiving little or no data with a relatively higher SNR (after decoding) than users who are receiving data.

Power control techniques are needed which can generate appropriate TPC commands in the face of intentionally-adjusted transmitted power. One embodiment corresponds to a process, which distinguishes an intentional offset in power used by the transmitter when transmitting a signal with a variable data rate from a change in signal power due to a fluctuation in path loss, such as path loss due to Rayleigh fading. This process will be described in greater detail later in connection with FIG. 7. This advantageously generates a nominal or reference power level useful for TPC. In one example, the nominal power level is referenced to a power for a full-rate data rate, but of course, any reference level can be used.

One embodiment uses a SNR of another signal transmitted at a fixed power level (not power controlled), such as that of a beacon signal or a pilot signal, as a proxy for the SNR of the corresponding traffic signal. This technique is applicable only to transmit power control (TPC) of stations that emit such beacon signals or pilot signals, such as base stations 100. The beacon signal or pilot signal should be relatively close in time and frequency to the traffic channel for the Rayleigh fading to be similar between the beacon signal or pilot signal and the traffic signal that is power controlled. The beacon signal or pilot signal should also emanate from the same transmitting source as the traffic channel.

The process advances to a decision block 620. In the decision block 620, the nominal SNR is compared to a target SNR. For example, the target value for the SNR can be adaptively determined as described earlier in connection with FIG. 5. While the target value for the SNR can adaptively change over time, it typically changes relatively slowly compared to the speed of execution of the power control process of FIG. 6. For the purposes of understanding the inner loop of the power control process, the target value for the SNR can be considered fixed. The nominal SNR can be of the traffic channel that is carrying the corresponding data or can be of the other signal, such as a beacon signal or a pilot signal, being used as a proxy.

When the nominal SNR is less than the target SNR, the process proceeds from the decision block 620 to a state 630, and a request for an increase in power is generated by the receiver and sent to the transmitter so that future transmissions will be of increased power to raise the nominal SNR (within the transmitter's power limits). In one embodiment, the stations communicate this information using a binary transmit power control (TPC) bit, which indicates to the transmitter to adjust (up or down) the output power for the corresponding traffic channel by a relative increment. For example, in one embodiment, the increment corresponds to 1 dB, but other step sizes can be used.

When the nominal SNR is greater than the target SNR, the process proceeds from the decision block 620 to a state 640, and a request for a decrease in power is generated. For example, this request can correspond to a TPC bit corresponding to a down adjustment.

In one embodiment with an optional state 650, the process advances from the state 630 or the state 640 to the optional state 650, and the process monitors power adjustment requests to estimate an amount of TPC adjustment used by the transmitter. Monitoring is optional and is not used with the process for determining a nominal SNR using determined data rates, which will be described in connection with FIG. 7. However, monitoring can be useful when used with the process for determining nominal SNR using another signal that will be described later in connection with FIG. 8. Where single-bit TPC commands are used for up and down adjustments and where step sizes correspond to a uniform value, such as 1 dB, the bookkeeping for the power adjustment can correspond to a sum of the up adjustments and a sum of the down adjustments.

Figure 7:
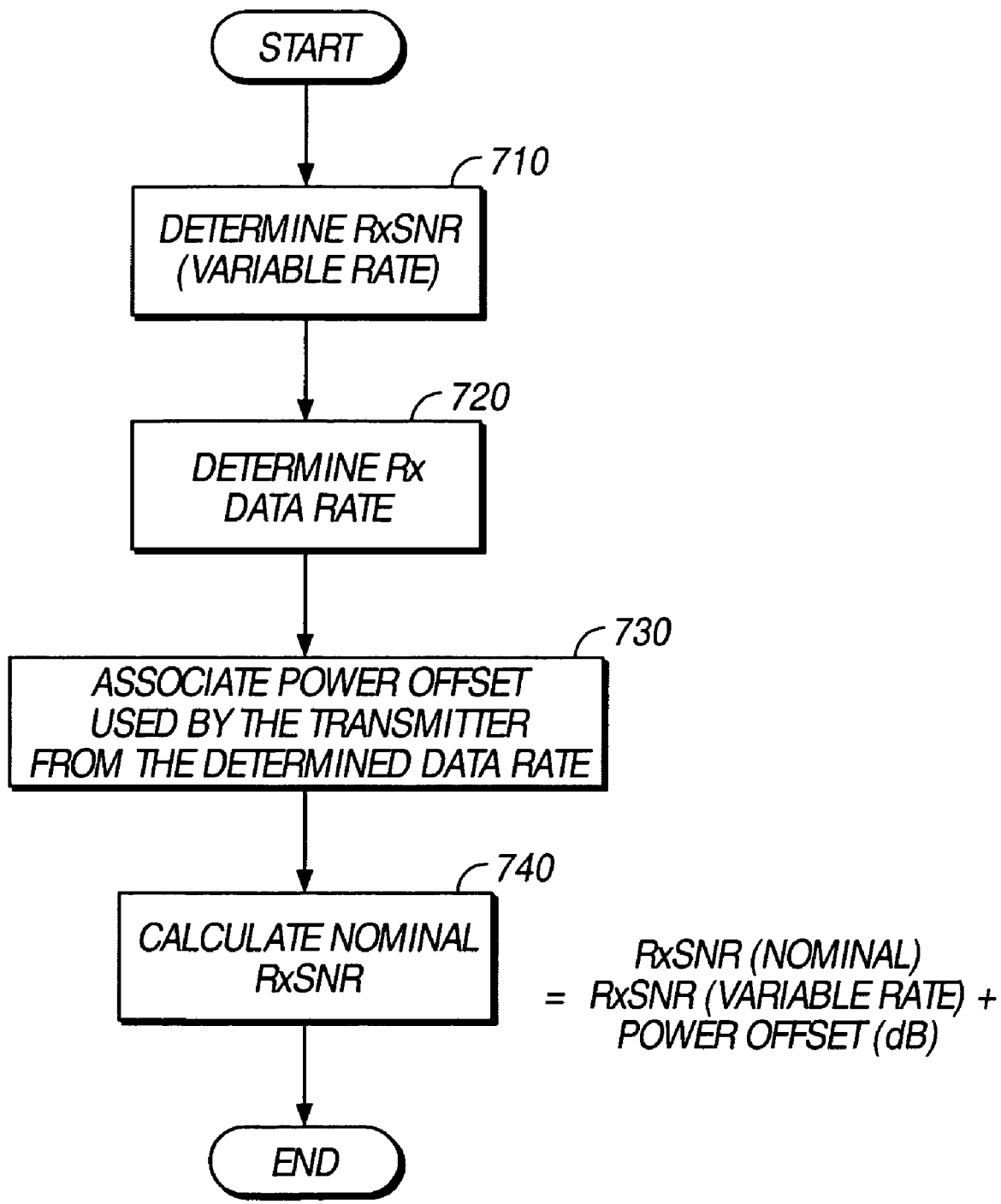
FIG. 7 illustrates a process of determining a reference signal-to-noise ratio (SNR) based on a data rate.

FIG. 7 illustrates a process of determining a nominal or reference signal-to-noise ratio (SNR) based on a data rate. The illustrated process is applicable to both base stations 100 and to mobile stations 102. This process can be used for a state 610 of the process illustrated in FIG. 6. The process distinguishes power adjustments performed for a change in a data rate from variations in received signal power due to environmental sources, such as from Rayleigh fading. The illustrated process can be modified in a variety of ways. For example, in another embodiment, various portions of the illustrated process can be combined, can be rearranged in an alternate sequence, can be removed or substituted, and the like.

The illustrated process begins at a first state 710 by determining the SNR of the received data signal. This particular SNR corresponds to the SNR of the signal code chips or symbols for the received data signal which corresponds to a SNR before accounting for the coding gain associated with the transmission and therefore, varies according to adjustments in power made when transmitting the received data signal at varying data rates. The measurement of the SNR for the signal code chips or prior to decoding is a process that may be performed by CDMA receivers, particularly CDMA receivers using TPC. For example, see section 25.214 Physical Layer Procedures (FDD) of the 3GPPP Technical Standards document, and in particular, to discussions of TPC, received signal code power (RSCP), interference signal code power (ISCP), signal to interference ratio (SIR), and the like.

The process advances to a state 720. In the state 720, the process proceeds to determine the received data rate. The data rate can be retrieved from a control word, can be inferred from the received SNR, and the like. In a UMTS-TDD system, the received data rate can be retrieved from the data rate control word, which is an embedded control word. In one embodiment, which will be described in greater detail later in connection with FIG. 9, the transmit data rate is used to generate an estimate for the received data rate.

The process advances to a state 730. In the state 730, the process proceeds to associate a power offset or adjustment in power used by the transmitter in transmitting the received signal to the receiver. This associated power offset or adjustment is commensurate with the data rate of the received signal. A very broad range of techniques can be used to associate a power offset with a data rate. For example, in a system that is symmetrical, where both a base station 100 and a mobile station 102 can select a data rate used to send data for a signal and adjust a transmitted output signal power level according to the selected data rate, a lookup table references reductions in power (power offset) from a power used for a full-data rate will typically exist for calculating the power to be used on the transmitter. An example of such a table was described earlier in Table I. In a symmetrical system, the base station 100 and the mobile station 102 should adjust power for changes in data rates in substantially the same manner. Accordingly, the lookup table used for the transmit side can be reused on the receiver side to determine the power offset applied. Other variations can apply. For example, a power offset can be estimated from a computation of the coding gain due to the use of a lower data rate than the full-data rate.

In one embodiment, power offsets are associated with ranges of data rates. This can be useful when, for example, a data rate is calculated, and the actual data rate is not confidently known due to, for example, burstiness of the transmitted data, short sampling periods, and the like.

In many communications systems, communications can be duplex. In a UMTS-TDD system, the communication from a base station and a mobile station can be time-division duplexed using the same frequency channel. In one embodiment, the transmitted data rate of traffic signals being sent out of station are used to bias the selection of the power offset. This will be discussed in greater detail later in connection with FIG. 9.

The process advances to a state 740. In the state 740, the process proceeds to calculate a nominal SNR from the received SNR of the received signal and the power offset associated with the data rate of the received signal. For example, Equation 1 illustrates an example of a calculation for the nominal SNR.

$$RxSNR(nom) = RxSNR(obs) + PowerOffset(dB) \quad \text{Equation 1}$$

In Equation 1, the signal-to-noise ratios and the power offset are expressed in decibels. In Equation 1, the variable RxSNR(nom) corresponds to the nominal SNR that is desirably compensated for intentional power adjustments due to varying data rates. The variable RxSNR(obs) corresponds to an observed SNR of the received data signal as determined in the state 710. The variable PowerOffset(dB) corresponds to the associated power offset. The variable PowerOffset(dB) accounts for the decrease in SNR that occurs (prior to decoding) when the transmitted power is adjusted down for less than full-rate data signals.

Figure 8:
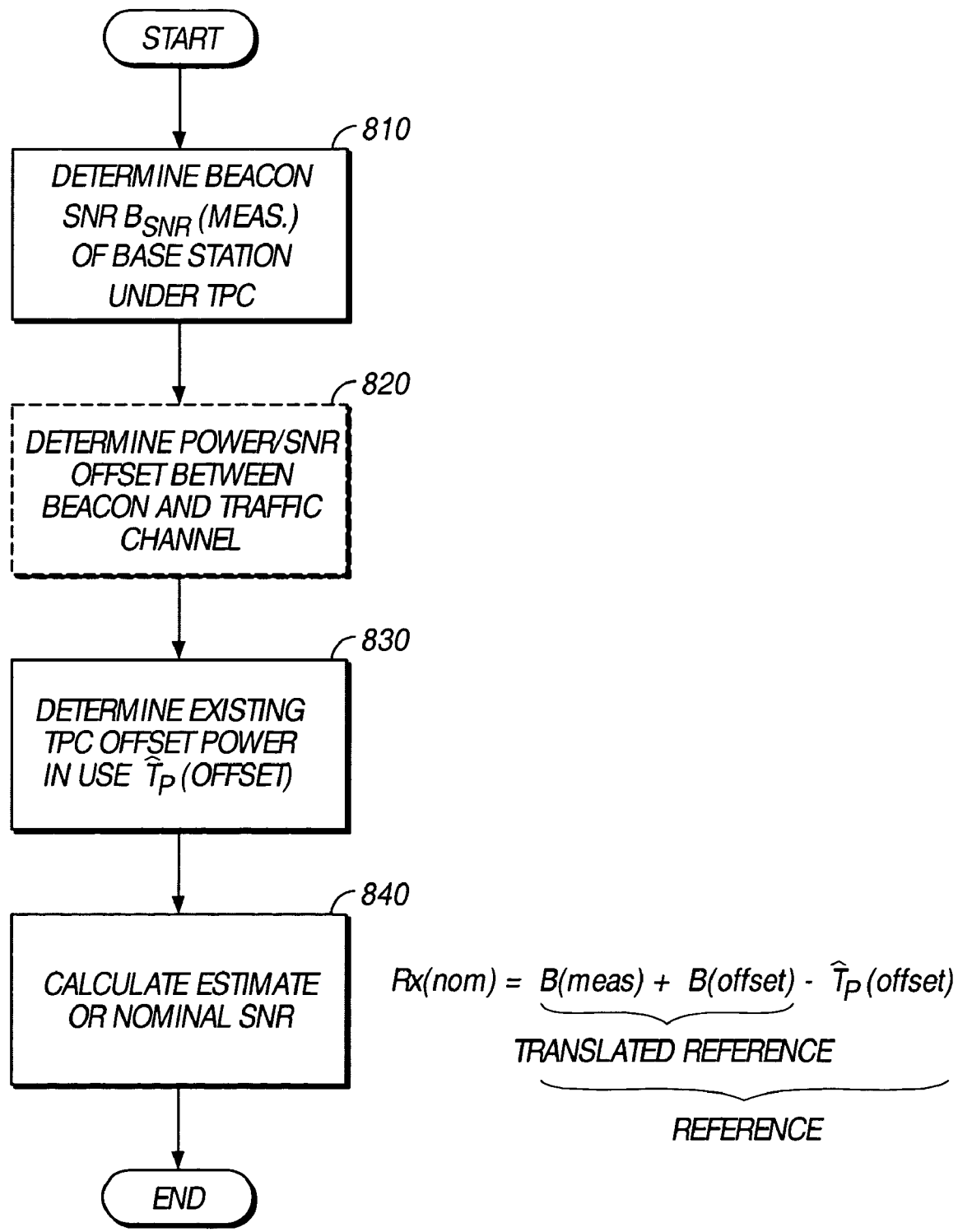
FIG. 8 illustrates a process of using another signal, such as a beacon signal, as a reference for a signal-to-noise ratio (SNR) of a traffic channel.

FIG. 8 illustrates a process of using another signal, such as a beacon signal or a pilot signal, as a reference for a signal-to-noise ratio (SNR) of a traffic channel. For the purposes of this disclosure, the term "beacon" will be used to describe any signal from a base station 100 that is provided at a relatively constant power output such as a signal from a base station 100 that is intended to be received by multiple subscribers, e.g., multiple mobile stations 102, for synchronizing to the base station 100, for conveying system information, for assisting the handover process to or from the base station 100, and the like. While typically constant, the power of the beacon signal from a base station 100 can be varied relatively slowly for load balancing of subscribers among base stations 100. Because the beacon signal is typically used for other purposes, a measure of the beacon SNR is typically already performed and available.

In the illustrated process, the SNR of the beacon signal is used as a proxy for the SNR of the traffic channel. It is desirable for the beacon signal to be of about the same time and frequency as the traffic channel to ensure that the Rayleigh fading characteristics are similar. In addition, it is desirable to have the beacon signal with a relatively constant output power to be applicable to the process depicted in FIG. 8. Also, in the context of a cellular telephone network, the beacon signal is typically a signal that is only generated by a base station 100 and is typically not generated by a mobile station 102. The illustrated process can be modified in a variety of ways. For example, in another embodiment, various portions of the illustrated process can be combined, can be rearranged in an alternate sequence, can be removed or substituted, and the like.

The illustrated process begins in a first state 810 by determining the SNR of the beacon signal from the base station 100 under transmit power control (TPC). Since multiple base stations 102 can have overlapping areas, a mobile station 102 can receive more than one beacon signal at a time. For the purposes of power control, however, the one or more beacon signals of interest correspond to the beacon signals from the particular base stations 100 that are also sending a downlink under TPC to the mobile station 102. Since the power of the beacon signal is relatively constant in this embodiment, variations in the SNR of the received beacon signal can be attributed to path losses, such as environmental conditions. Further, when the time and frequencies of the beacon signal and the traffic channel are relatively close or are the same, the environmental conditions experienced by the beacon signal should also be experienced by the traffic channel.

The process advances to an optional state 820, where the process determines a power and/or a SNR offset between the beacon and a nominal power and/or SNR for the traffic channel. The beacon signal can be provided at a different power level, such as a higher output power level, than a signal for a traffic channel. These power levels can be converted or translated as desired. However, rather than translating beacon power levels and SNR levels to traffic channel levels, the process described earlier in connection with FIG. 6 can use a target SNR that is based on the beacon signal SNR and adjusted for prior TPC commands, thereby obviating such translating operations.

The process advances to a state 830, where the process determines an existing TPC offset power currently in use by the transmitter. While the power of the beacon signal is relatively constant, the power of the traffic channel varies according to TPC. In one embodiment, the process tracks the TPC adjustments made to the traffic channel to normalize the beacon signal SNR to power adjustments made to the traffic channel. In one example, where the TPC commands correspond to a single bit of data for an up command or a down command, the process can maintain running sums of the up commands and the down commands. These up commands and down commands can be combined to generate an estimate of the power offset used by the base station 102 due to previously received TPC commands.

For example, if 100 down commands are summed with 80 up commands, the process can determine that the base station 102 is operating the traffic channel with a TPC power offset corresponding to a net of 20 down commands. Where, for example, each TPC command corresponds to 1 decibel (dB), this would result in estimate for a relative reduction in power of 20 dB.

The communication between a mobile station 102 and a base station 100 is often imperfect. Occasionally, data is dropped. Thus, there can be a drift over time between what the mobile station 102 has determined it has sent for TPC control and what the base station 100 has correctly received. This can be remedied, by, for example, communicating an absolute reference on at least occasional basis from the base station 102 to the mobile station 100 so that the base station 100 can be updated with an actual amount of offset used in the base station 100.

The process advances to a state 840, where the process calculates an estimate for the nominal SNR of the received signal by using the SNR of the beacon signal and the power offset from the TPC commands. An additional offset can exist because of differences in power and/or coding between the beacon signal and the traffic channel, but that these differences can be readily accommodated by using a relatively static variable or a constant such as another offset, via selecting a compensating value for a target SNR, or the like.

Equation 2 and 3 represent examples of equations that can be used to generate a nominal SNR. In Equation 2, the SNR is kept with reference to the beacon signal SNR. In Equation 3, the SNR is converted or translated to the traffic signal SNR.

$$B_{SNR}(\text{ref}) = B_{SNR}(\text{obs}) - T_P(\text{offset}) \quad \text{Equation 2}$$

$$Rx_{SNR}(\text{ref}) = B_{SNR}(\text{obs}) - B_P(\text{offset}) - T_P(\text{offset}) \quad \text{Equation 3}$$

In Equation 2, $B_{SNR}(\text{ref})$ corresponds to the reference SNR, $B_{SNR}(\text{obs})$ corresponds to the observed beacon signal SNR, and $T_P(\text{offset})$ corresponds to the estimated offset power from accumulated TPC commands. In addition, in Equation 3, $Rx_{SNR}(\text{REF})$ corresponds to the reference SNR, and $B_P(\text{offset})$ refers to an offset between the beacon signal SNR and the traffic channel SNR due to variations in output power (not counting the TPC adjustments) and SNR differences due to factors such as coding gain.

Figure 9:
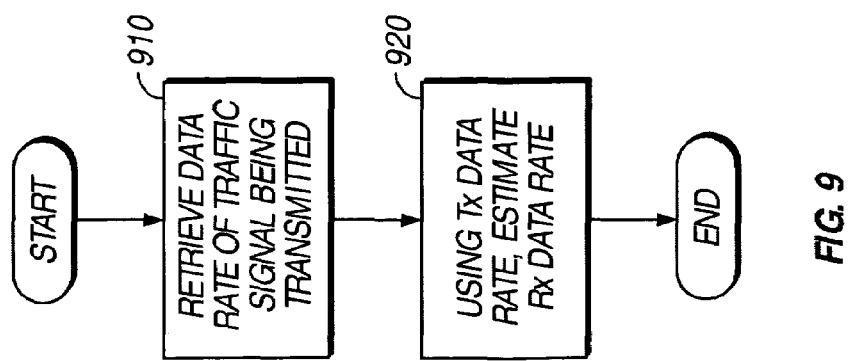
FIG. 9 illustrates an example of a method of estimating a received data rate.

FIG. 9 illustrates an example of a method of estimating a received data rate. For example, this method can be used to estimate a data rate when one is not known, in combination with other techniques to estimate the data rate, and also to bias an existing data rate estimate, whether measured or estimated.

The illustrated process starts at a state 910 by retrieving the data rate of data being transmitted. A station has control over its transmitted data rate, but would not necessarily be aware (at least in a manner timely for power control), the data rate of data being received. The process advances to a state 920, where the transmitted data rate is used to estimate the received data rate. In many instances, the transmitted data rate and the received data rate are associated.

The following is an example of how the technique can be used. A common example of a source of data for variable-rate data is voice communications. Callers talk, are quiet, then talk again, are quiet again, and so forth. In many instances, when two people are talking, one is listening while the other is talking and vice versa. Accordingly, when a station (mobile or base) is handling a voice call, and the data rate for data being sent is relatively high, the incoming data rate can be expected to be relatively low. Conversely, when the data rate being sent is relatively low, the incoming data rate can be expected to be relatively high.

For example, the transmitted data rate can be translated to generate an estimate for the received data rate and used in the state 720 of FIG. 7. In another example, the transmitted data rate can be used to bias a received data rate determined by another method. For example, a one-dimensional lookup table of data rates versus power offsets can be converted to a two-dimensional table with an extra dimension corresponding to the transmitted data rate. In another example, a mathematical formula can be used to modify a data rate or a power offset with the transmitted data rate.

Figure 10:
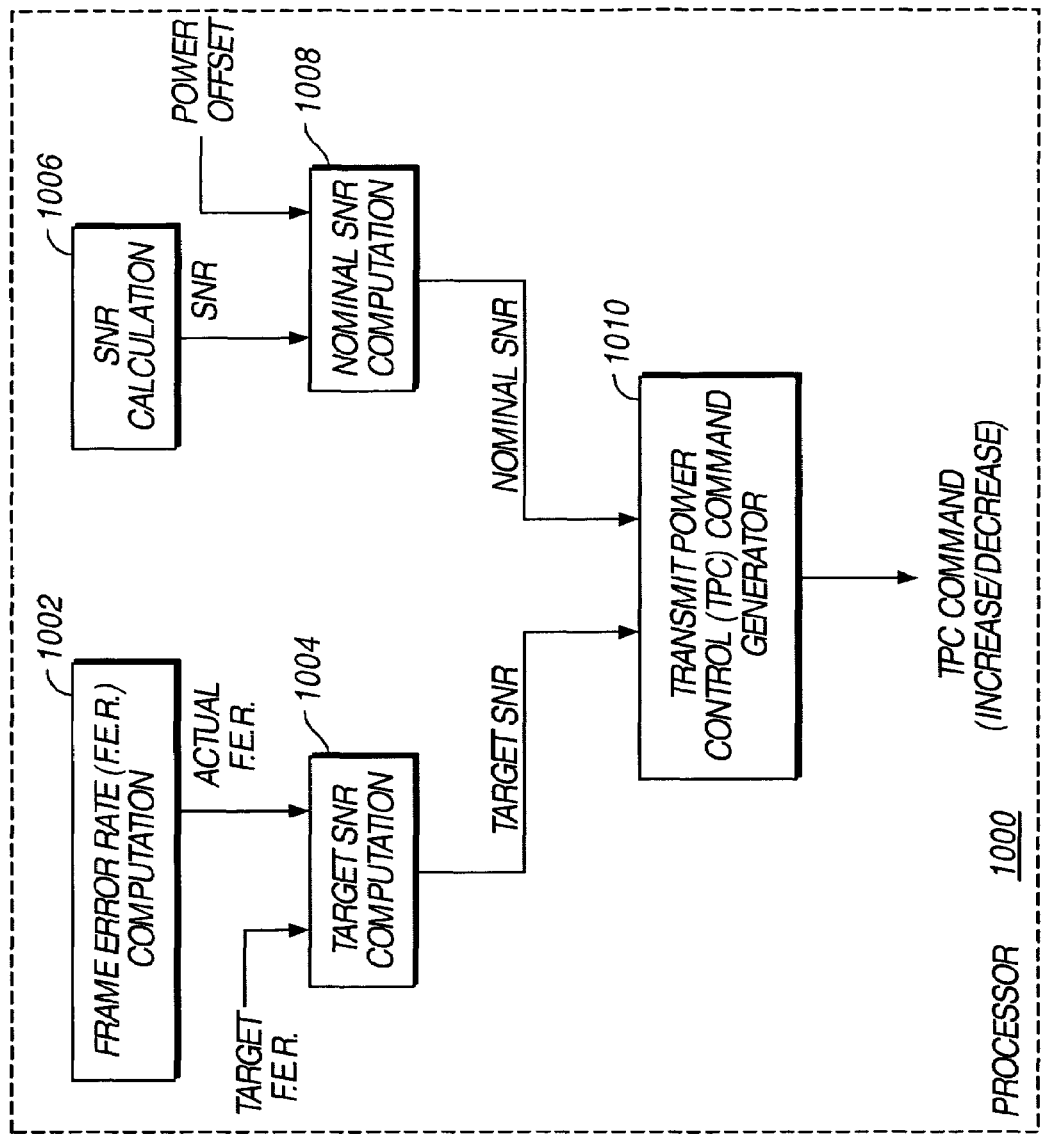
FIG. 10 illustrates an example of an apparatus for determining power control commands.

FIG. 10 illustrates an example of a processor 1000 that can be used to generate power control commands. Various modules of the processor 1000 can be made implemented with hardware, with software (or firmware), or with a combination of both hardware and software. Various modules can be rearranged, combined, deleted, and the like. For example, while the illustrated example may show the calculation of a parameter, in another embodiment, the parameter may be retrieved or inferred from other data.

As shown in FIG. 10, the processor 1000 is represented by a Frame Error Rate (F.E.R.) computation module 1002, a target SNR computation module 1004, a signal-to noise-ratio (SNR) calculation module 1006, a nominal SNR computation module 1008, and a transmit power control (TPC) command generator 1010. The Frame Error Rate (F.E.R.) computation module 1002 computes an actual F.E.R. for received data. The actual F.E.R. and a target F.E.R. are provided as inputs to the target SNR computation module 1004, which generates a target SNR.

The signal-to-noise ratio (SNR) calculation module 1006 calculates a signal characteristic, such as a SNR. The SNR and a power offset are provided as inputs to the nominal SNR computation module 1008. In one example, the power offset is determined using data rates. The nominal SNR computation module 1008 generates a nominal SNR as an output.

The target SNR and the nominal SNR are provided as inputs to the transmit power control (TPC) command generator 1010, which generates TPC commands. For example, these commands can be used to request increases or decreases in transmitted power.

Further details of power control in the context of UMTS TDD systems will be described in greater detail in the following with respect to Low Chip Rate (LCR) and High Chip Rate (HCR) systems.

Power Control in a Low Chip Rate (LCR) System

The slot structure of LCR places the power control bits after the midamble. The same slot structure applies for uplink (UL) slots, which carry DL TPC bits, and to downlink (DL) slots, which carry UL TPC bits. The field length for Synchronization Shift (SS) bits is the same as that for TPC bits. The TFCI (Transport Format Combination Indicator) field may or may not be present in the slot depending on the slot format. Note that the TFCI codeword spans a radio frame (10 ms) and therefore spans two 5 ms sub-frames.

In DL slots, TPC bits from different users are code division multiplexed using SF 16 codes. In UL slots, TCP bits use the same spreading factor as that used for the data portion. TPC bits for each user are transmitted in the physical channel corresponding to the lowest physical channel sequence number (from Rate Matching). LCR allows using more than one code for transmission of TPC bits for a given user (configured by higher layers).

For example, the TPC and SS fields can have the following lengths: (i) 1 TPC modulation symbol/slot corresponding to SF chips/slot, where for QPSK, 1 modulation symbol corresponds to 2 bits and for 8PSK, 1 modulation symbol corresponds to 3 bits; (ii) no TPC modulation symbol/slot; and (iii) 16/SF modulation symbols/slot corresponding to 16 chips/slot, where SF is less than or equal to 16, where for QPSK, 16/SF modulation symbols correspond to 2*16/SF bits, and for 8PSK, 16/SF modulation symbols correspond to 3*16/SF bits.

Power Control in HCR

The slot structure of HCR places the power control bits after the midamble. DL slots in HCR do not carry TPC bits as there is no UL power control based in L1 control signaling in HCR. Instead, a slower power control message based is supported. The TFCI field may or may not be present in the slot depending on the slot format. As in LCR, the TFCI codeword spans a radio frame (10 ms).

In UL slots, TPC bits are transmitted at SF 16 using the channelization code in the branch with the highest code numbering of the allowed OVSF sub-tree. For example, the TPC field can have the following lengths: (i) 1 TPC modulation symbol/slot corresponding to 16 chips/slot (with QPSK modulation, 1 TPC modulation symbol/slot corresponds to 2 TPC bits/slot); (ii) No TPC modulation symbol/slot; and (iii) 4 TPC modulation symbols/slot corresponding to 64 chips/slot allowed for HS-SICH only (with QPSK modulation, 4 TPC modulation symbol/slot correspond to 8 TPC bits/slot).

The 3GPP technical standard (TS) 25.221, titled "Physical Channels and mapping of transport channels onto physical channels (TDD)," specifies that the transmit power within a timeslot is constant for the UMTS TDD systems. There is no explicit mention to allow for any power offset for the transmission of the TPC bits and therefore, the TPC modulation symbols are transmitted at the same power level as that of the data modulation symbols. In the DL, the transmission of TPC bits for different users occurs at the same time. A power offset (boost) of the TPC bits with the current slot structure would typically cause an increase of transmit power for a short duration of time (which can cause distortion of the transmitted waveform due to operation of the power amplifier in the non-linear region).

CDMA systems allow exploiting voice activity by reducing the transmit power for lower data rates. To be able to exploit voice activity, power control commands have to be derived for a nominal reference. The transmit power of a particular channel will then be corrected with the last power control command and with the power offset between the rate being transmitted and the nominal reference. There are many ways to run power control over a nominal reference. For example, the power control channel can be transmitted at a known reference power. The SNR of this channel is computed at the receiver and the Up/Down command is generated by comparison to a threshold (power control set-point). The transmitter can then correct the transmit power using this command and will further offset the transmit power depending on the transmitted data rate (TFC).

WCDMA and CDMA2000 systems transmit the Pilot Channel at a particular Ec/Ior, therefore the SNR of the Pilot Channel can be used for the generation of the Up/Down TPC commands. The midambles in UMTS TDD systems constitute the equivalent to the Pilot Channel in WCDMA and cdma2000 systems, however, unfortunately, they are not transmitted at a fixed power and therefore cannot be used as a nominal reference for power control.

UMTS TDD systems use a beacon channel. The beacon channel is transmitted at a known slot at a reference power. The beacon channel's SNR can be used as the nominal reference used for variable rate power control. Reliability in the reception of TPC bits; and power control of a variable rate connection can be features to UMTS-TDD and other systems. These two issues will be described in greater detail in the following.

Reliability in Reception of TPC Bits

TPC modulation symbols are transmitted at the same power level as the data modulation symbols. In a variable rate connection, if voice activity is to be exploited, lower data rates protected with a lower code rate can be transmitted at lower power, and higher data rates can be transmitted at higher power. Consequently, if the same coding is used for the TPC bits for different data rates, the TPC bits transmitted in frames at lower data rates will be less reliable than those transmitted in frames at higher data rates. This also applies to the other Layer 1 control information transmitted embedded into the slot, including the TFCI, and for LCR, also the SS bits. This scenario should be addressed in a way where the worst case (lowest transmit power) should provide sufficient demodulation reliability.

Power Control of a Variable Rate Connection

Different data rates have different code rates, therefore the transmit power used for a given GoS reception, e.g., FER around 1%, is different for different data rates. In a variable rate connection, if voice activity is to be exploited, the receiver needs to control power to the appropriate set-point. A nominal set-point can be chosen, e.g. TFC with highest code rate and therefore highest power requirement) and power control bits can be derived for that nominal reference. If the power offsets for different TFC's with respect to the nominal reference are known at the transmitter, the power control derived for the nominal reference can be used to set the transmit power for any other TFC.

Rate Determination Based Variable Rate Power Control

One embodiment is based in rate determination at the end of each radio-frame. When the rate is known, the required SNR threshold (power control set-point) to compare the received SNR against is known, and therefore an adequate power control command can be generated. The 3GPP technical standard (TS) 25.222, titled "Mutiplexing and channel coding (TDD)" specifies the TFCI coding for UMTS TDD systems.

The coding of the TFCI field is the same for LCR (QPSK) and HCR. There are three types of coding depending on the number of TFCI bits to encode: (i) TFCI field length 6-10 bits: (32, 10) 2nd order RM code, if the length is less than 10 bits, zero padding is used to 10 bits (MSBs to 0), and $N_{TFCI\_codeword}$: 32 coded symbols; (ii) TFCI field length 3-5 bits: (16, 5) bi-orthogonal code, if the length is less than 5 bits, zero pad to 5 bits (MSBs to 0), and $N_{TFCI\_codeword}$: 16 coded symbols; and (iii) TFCI field length 1-2 bits: (4,1) or (8,2) repetition code, and $N_{TFCI\_codeword}$: 4 or 8 coded symbols. If the minimum TTI in any constituent TrCH is greater than or equal to 20 ms, then repetition of codeword in successive radio frames in the TTI is used.

In a voice connection, the constituent TrCHs have a TTI greater than or equal to 20 ms (DTCH TTI=20 ms, DCCH TTI=40 ms) and the same TFCI codeword is transmitted in the two radio-frames of the 20 ms TTI. The receiving data rate can be estimated after each of the two radio-frames in the 20 ms TTI.

This allows efficient variable rate power control for HCR (where, for a voice connection, there is one used slot in every 10 ms radio-frame, see FIG. 3), however would not be appropriate for LCR (where, for a voice connection, there is one used slots in every 5 ms subframe). In one embodiment, for LCR a change in the current specification can be implemented which changes the TFCI codeword to span a 5 ms subframe as opposed to spanning a 10 ms radio-frame.

In HCR, there is one TPC bit in each 10 ms interval, the power control rate is around 100 Hz. On the other hand, in LCR there is one TPC bit in each 5 ms interval yielding a power control rate of about 200 Hz.

Power Control Loop Timing for High Chip Rate (HCR)

In one illustrative example of timing, the following assumptions are used for HCR: there are 2 slots allocated for DL overhead and 1 slot allocated for UL overhead. Then, the voice slots for UL and DL will be separated by 6 slots within the radio-frame to allow for uniform assignment of slots across voice users. For this assumption:

| HCR DL PC Concept | Value |
| --- | --- |
| UE: time to demod TFCI and generate Up/Dwn Cmd | 4 ms |
| NodeB: time to demod TPC and apply it to tx | 4.66 ms |
| Time from measurement made to power changed | 9.66 ms |

If the current specification were to be changed to have the TFCI for LCR span a 5 ms sub-frame as opposed to a 10 ms radio-frame, the following power control loop timing values can be as follows:

| LCR DL PC Concept | Value |
| --- | --- |
| UE: time to demod TFCI and generate Up/Dwn Cmd | 2.3 ms |
| NodeB: time to demod TPC and apply it to tx | 1.35 ms |
| Time from measurement made to power changed | 4.66 ms |
| NodeB: time to demod TFCI and generate Up/Dwn Cmd | 1.35 ms |
| UE: time to demand TPC and apply it to tx | 2.3 ms |
| Time from measurement made to power changed | 4.66 ms |

Beacon Channel Based Variable Rate Power Control

Since the beacon channel is transmitted at a reference power level, its SNR can be used as an input to the power control loop. Since the beacon channels are only transmitted on the DL (i.e., from the base station), this scheme is appropriate for DL Power Control to a mobile station or UE. The beacon channel is not power controlled, however the evolution of the channel will be estimated by measuring its SNR. The requirement then resides at the NodeB (transmitter) where the power offsets for each of the TFCs should be referenced to the beacon channel fixed transmit power. Using the same assumptions for timing, the following timing applies for HCR:

| HCR DL PC Concept | Value |
| --- | --- |
| UE: time to estimate Beacon SNR and generate Up/Dwn Cmd | ≧5.33 ms |
| NodeB: time to demod TPC and apply it to tx | 4.66 ms |
| Time from measurement made to power changed | 10.99-14.33 ms |

As illustrated in the foregoing table, the time from the measurement to the change in the transmit power has increased between about 1.33 ms and about 4.67 ms. In this example, the scheme based on rate determination should yield better performance (assuming reliable detection of the TFCI information) than the beacon channel approach.

The following table illustrates timing for LCR:

| HCR DL PC Concept | Value |
| --- | --- |
| UE: time to estimate Beacon SNR and generate Up/Dwn Cmd | 5.275 ms |
| NodeB: time to demod TPC and apply it to tx | 1.35 ms |
| Time from measurement made to power changed | 7.6375 ms |

The timing requirement used in the example above for the NodeB to turn-around the TPC bit is relatively strict (2 slots). It was also this strict for the rate determination based variable rate power control scheme timing example described earlier. The time from the measurement time to the change in the transmit power has increased from about 4.66 ms to about 7.6375 ms (almost 3 ms increase), however, advantageously, this variable rate power control does not require any change in the standard.

The DwPTS (DL Pilot Time Slot) is also transmitted at a reference power level, therefore it can also be used to drive the variable rate power control loop. The power offsets of the different TFCs would have then to be referenced to the transmit power of the DwPTS.

Without changes to the current specification of UMTS-TDD, effective variable rate power control can be implemented for DL of LCR and HCR systems. LCR variable rate power control can be based on the SNR of the Beacon Channel or DwPTS. HCR variable rate power control can be based on the SNR of the Beacon Channel or on the rate determination with decoding of TFCI every radio-frame The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for a wireless communication system, the apparatus comprising:
    a receiver configured to receive a transmitted signal from a transmitter having at least a first data rate and a second data rate that is other than the first data rate, wherein a transmitted power of the transmitted signal for the second data rate is adjustable by an offset amount relative to a transmitted power for the first data rate;
    a receiver circuit configured to determine a reference signal characteristic associated with the transmitted signal; and
    a processing circuit configured to compare the reference signal characteristic to a target and to generate a power control command based at least in part on the comparison and on information provided by the transmitted signal.

2. The apparatus as defined in claim 1, wherein the reference signal characteristic is related to at least a signal to noise ratio (SNR).

3. The apparatus as defined in claim 1, wherein the processing circuit is further configured to:
generate a command for an increase in transmitted power when the reference signal characteristic is less than the target; and
generate a command for a decrease in transmitted power when the reference signal characteristic is greater than the target.

4. The apparatus as defined in claim 1, wherein the receiver circuit is further configured to:
determine a signal characteristic of the transmitted signal;
determine a data rate of the transmitted signal;
determine a power offset value used for the transmitted signal at least partially based on the determined data rate; and
combine the power offset value and the signal characteristic to determine the reference signal characteristic.

5. The apparatus as defined in claim 1, wherein the receiver circuit is further configured to:
determine a signal characteristic of the transmitted signal;
determine a power offset used for the transmitted signal at least partially based on a data rate of a second transmitted signal, where the second transmitted signal is sent by a device receiving the transmitted signal; and
combine the power offset and the determined signal characteristic to determine the reference signal characteristic.

6. The apparatus as defined in claim 1, wherein the information comprises a data rate of the transmitted signal.

7. The apparatus as defined in claim 1, wherein the receiver comprises a mobile station and the transmitted signal is transmitted from a base station, wherein the reference signal characteristic is at least partially based on a signal characteristic of a signal transmitted by the base station that is different from the transmitted signal.

8. The apparatus as defined in claim 1, wherein the receiver comprises a mobile station and the transmitted signal is transmitted from a base station, where the receiver circuit is further configured to:
receive a second transmitted signal from the base station;
determine a signal characteristic of the second transmitted signal;
determine an existing transmit power control (TPC) power offset for the transmitted signal; and
use at least the signal characteristic of the second transmitted signal and the TPC power offset to determine the reference signal characteristic.

9. The apparatus as defined in claim 8, wherein the receiver circuit is further configured to determine the existing TPC power offset using a plurality of TPC commands, and to update a count of TPC commands according to the generated power control command.

10. The apparatus as defined in claim 1, where the receiver circuit is further configured to:
receive an indicator of a power offset from the base station; and
generate a power reference value based at least in part on the indicator.

11. A method of controlling power in a wireless communication system, the method comprising:
receiving from a transmitter a transmitted signal having at least a first data rate and a second data rate that is other than the first data rate, wherein a transmitted power of the transmitted signal for the second data rate is adjustable by an offset value relative to a transmitted power for the first data rate;
determining a reference signal characteristic associated with the transmitted signal;
comparing the reference signal characteristic to a target; and
generating a power control command based at least in part on the comparison and on information provided by the transmitted signal.

12. The method as defined in claim 11, wherein the reference signal characteristic comprises at least a reference signal-to-noise ratio (SNR).

13. The method as defined in claim 11, wherein generating the power control command further comprises:
generating a command for an increase in transmitted power when the reference signal characteristic is less than the target; and
generating a command for a decrease in transmitted power when the reference signal characteristic is greater than the target.

14. The method as defined in claim 11, wherein determining the reference signal characteristic further comprises:
determining a signal characteristic of the transmitted signal;
determining a data rate of the transmitted signal;
determining a power offset value used for the transmitted signal at least partially based on the determined data rate; and
combining the power offset value and the signal characteristic to determine the reference signal characteristic.

15. The method as defined in claim 11, wherein determining the reference signal characteristic further comprises:
determining a signal characteristic of the transmitted signal;
determining a power offset used for the transmittal signal at least partially based on a data rate of a second transmitted signal, where the second transmitted signal is sent to the transmitter; and
combining the power offset and the determined signal characteristic to determine the reference signal characteristic.

16. The method as defined in claim 11, wherein the information comprises at least a data rate of the transmitted signal.

17. The method as defined in claim 11, wherein the method is implemented in a mobile station and the transmitted signal is transmitted from a base station, wherein the reference signal characteristic is based on a signal characteristic of signal a transmitted by the base station that is different from the transmitted signal.

18. The method as defined in claim 11, wherein the method is implemented in a mobile station and the transmitted signal is transmitted front a base station, the method further comprising:
receiving a second transmitted signal from the base station;
determining a signal characteristic of the second transmitted signal;
determining an existing transmit power control (TPC) power offset for the transmitted signal; and
determining the reference signal characteristic based at least in part on the signal characteristic of the second transmitted signal and the TPC power offset.

19. The method as defined in claim 18, wherein determining the existing TPC power offset comprises using a plurality of TPC commands, the method further comprising maintaining a count according to the generated power control command.

20. The method as defined in claim 19, further comprising:
receiving an indicator of a power offset from the base station; and generating a power reference value based at least in part on the indicator.

21. The method as defined in claim 18, wherein the information comprises information about power offset actually used by the base station.

22. The method as defined in claim 18, wherein the second transmitted signal is transmitted from the base station at a power level independent of data rate.

23. The method as defined in claim 18, further comprising translating the reference signal characteristic to account for at least one of a nominal power offset or a nominal signal-to-noise ratio (SNR) offset between the transmitted signal and the second transmitted signal.

24. The method as defined in claim 11, wherein the transmitted signal carries data modulated with code division multiple access (CDMA), time-division multiple access (TDMA), and is also time-division duplexed (TDD).

25. A method of determining a reference signal characteristic, the method comprising;
   determining a signal characteristic of a received signal;
   adjusting the signal characteristic with an offset value to account for an adjustment in power due to an adjustment in code rate; and
   using the adjusted signal characteristic for power control.

26. A method of determining a signal characteristic, the method comprising:
   determining a signal characteristic of a received signal;
   separating a first component of the signal characteristic due to channel conditions and a second component due to a power adjustment from a change in data rate; and
   using the first component of the signal characteristic for power control.

27. A computer-readable storage medium having a set of computer-executable instructions, the computer-executable instructions comprising:
   a first set of instructions for receiving from a transmitter a transmitted signal having at least a first data rate and a second data rate that is other than the first data rate, wherein a transmitted power of the transmitted signal for the second data rate is adjustable by an offset value relative to a transmitted power for the first data rate;
   a second set of instructions for determining a reference signal characteristic associated with the transmitted signal;
   a third set of instructions for comparing the reference signal characteristic to a target; and
   a fourth set of instructions for generating a power control command based at least in part on the comparison and on information provided by the transmitted signal.

28. A computer-readable storage medium having a set of computer-executable instructions, he computer-executable instructions comprising:
   a first set of instruction for determining a signal characteristic of a received signal;
   a second set of instructions for adjusting the signal characteristic with an offset value to account for an adjustment in power due to an adjustment in code rate; and
   a third set of instructions for using the adjusted signal characteristic for power control.

29. A computer-readable storage medium having a set of computer-executable instructions, the computer-executable instructions comprising:
   a first set of instructions for determining a signal characteristic of a received signal;
   a second set of instructions for separating a first component of the signal characteristic due to channel conditions and a second component due to a power adjustment from a change in data rate; and
   a third set of instructions for further comprising using the first component of the signal characteristic for power control.

30. An apparatus for controlling power of a wireless communication system, the apparatus comprising:
   means for receiving from a transmitter a transmitted signal having at least a first data rate and a second data rate that is other than the first data rate, wherein a transmitted power of the transmitted signal for the second data rate is adjustable by an offset value relative to a transmitted power for the find data rate;
   means for determining a reference signal characteristic associated with the transmitted signal;
   means for comparing the reference signal characteristic to a target; and
   means for generating a power control command based at least in part on the comparison and on information provided by the transmitted signal.

31. The apparatus as defined in claim 30, wherein the receiving means comprises a base station.

32. The apparatus as defined in claim 30, wherein the receiving means comprises a mobile station.

33. The apparatus as defined in claim 30, wherein the receiving means comprises a receiver, and wherein the compensating means comprises a processor.

34. An apparatus for determining a reference signal characteristic, the apparatus comprising:
   means for determining a signal characteristic of a received signal;
   means for adjusting the signal characteristic with an offset value to account for an adjustment in power due to an adjustment in code rate; and
   means for using the adjusted signal characteristic in a power control loop.

35. The apparatus as defined in claim 34, wherein the determining means comprises a receiver and wherein the adjusting means comprises a processor.

36. An apparatus for determining a signal characteristic, the apparatus comprising:
   means for determining a signal characteristic of a received signal;
   means for separating a first component of the signal characteristic due to channel conditions and a second component due to a power adjustment from change in data rate; and
   means for using the first component of the signal characteristic for power control.

37. The apparatus as defined in claim 36, wherein the determining means comprises a receiver and the separating means comprises a processor.

* * * * *

UNITED STATES PATENT AND TRADEMARK OFFICE
CERTIFICATE OF CORRECTION

PATENT NO. : 7,657,277 B2
APPLICATION NO. : 11/233631
DATED : February 2, 2010
INVENTOR(S) : Montojo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1168 days.

Signed and Sealed this

Twenty-eighth Day of December, 2010

David J. Kappos
*Director of the United States Patent and Trademark Office*